United States Patent
Anderson et al.

(10) Patent No.: US 9,665,463 B2
(45) Date of Patent: May 30, 2017

(54) IN-PROCESS WRAPPED EXECUTION ENGINE(S) FOR TOOLING A DYNAMIC PROGRAM ACROSS A PROCESS BOUNDARY

(75) Inventors: Benjamin J. Anderson, Seattle, WA (US); Michael C. Fanning, Redmond, WA (US); Timothy S. Rice, Seattle, WA (US); Andrew R. Sterland, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 278 days.

(21) Appl. No.: 13/489,252

(22) Filed: Jun. 5, 2012

(65) Prior Publication Data

US 2013/0326490 A1 Dec. 5, 2013

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06F 11/36 | (2006.01) |
| G06F 9/00 | (2006.01) |
| G06F 21/00 | (2013.01) |
| G06F 9/54 | (2006.01) |
| G06F 9/455 | (2006.01) |

(52) U.S. Cl.
CPC ............ *G06F 11/36* (2013.01); *G06F 9/00* (2013.01); *G06F 9/541* (2013.01); *G06F 11/362* (2013.01); *G06F 11/3664* (2013.01); *G06F 21/00* (2013.01); *G06F 2009/45587* (2013.01)

(58) Field of Classification Search
None
See application file for complete search history.

(56) References Cited

U.S. PATENT DOCUMENTS

| | | | | |
|---|---|---|---|---|
| 5,983,016 | A | * | 11/1999 | Brodsky ............... G06F 8/71 714/E11.217 |
| 8,413,139 | B2 | * | 4/2013 | Shukla et al. ............. 718/1 |
| 8,626,919 | B1 | * | 1/2014 | Papakipos ............ H04L 67/10 709/226 |
| 2009/0007069 | A1 | | 1/2009 | Bliven, II et al. |

(Continued)

OTHER PUBLICATIONS

"Injecting Code Dynamically with the Debugging API", Retrieved at <<http://msdn.microsoft.com/en-us/library/bb384380.aspx, Retrieved Date: Dec. 26, 2011, pp. 3.

*Primary Examiner* — Craig Dorais
(74) *Attorney, Agent, or Firm* — Wade IP Law LLC

(57) ABSTRACT

Techniques are described herein that are capable of instantiating and executing in-process wrapped execution engine(s) for tooling a dynamic program across a process boundary. For instance, a dynamic language execution engine may be instantiated in a wrapper object that is hosted in a host process to provide a wrapped execution engine while the host process is running. The wrapped execution engine may be configured to provide information regarding execution of a targeted application of the host process to a requesting application. The wrapped execution engine may be isolated from other execution engine(s) that are included in the host process such that the targeted application does not have access to code that defines the wrapped execution engine. The targeted application may include one or more of the other execution engines.

20 Claims, 3 Drawing Sheets

(56) References Cited

U.S. PATENT DOCUMENTS

| | | |
|---|---|---|
| 2009/0228861 A1 | 9/2009 | Burton |
| 2009/0282474 A1* | 11/2009 | Chen ........................ G06F 21/53 726/21 |
| 2010/0023951 A1 | 1/2010 | Violleau et al. |
| 2010/0318618 A1 | 12/2010 | Parker et al. |
| 2011/0047613 A1 | 2/2011 | Walsh et al. |
| 2011/0107311 A1 | 5/2011 | McNulty et al. |
| 2011/0197180 A1 | 8/2011 | Huang et al. |

* cited by examiner

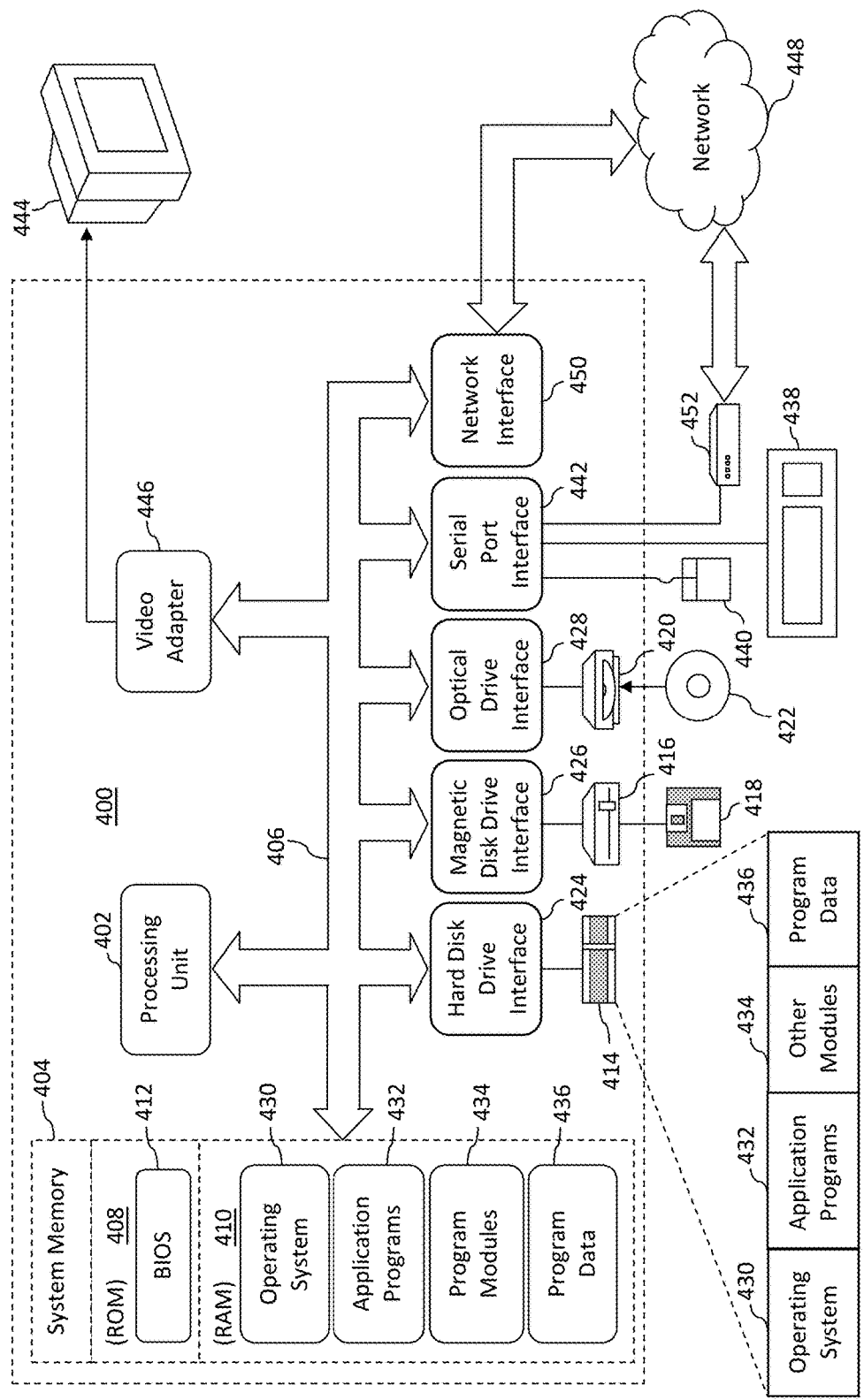

… (1)

IN-PROCESS WRAPPED EXECUTION ENGINE(S) FOR TOOLING A DYNAMIC PROGRAM ACROSS A PROCESS BOUNDARY

BACKGROUND

Historically, tooling functionality for web applications (e.g., msn.com, google.com, yahoo.com, facebook.com, etc.) is tightly coupled with the web applications. For instance, tools for a web browser (e.g., F12 tools for Internet Explorer® or Chrome tools for Google Chrome®) typically are integrated into the browser. Increasingly, however, applications that are external to web applications are providing tooling functionality for such web applications. Applications that are capable of performing tooling operations with respect to a web application are often referred to as requesting applications or tooling applications. The web applications on which tooling operations are performed are commonly referred to as targeted applications.

Performing tooling operations on web applications by requesting applications that are external to the web applications provides some challenges because information that is historically provided within web application tools (e.g., hypertext markup language (HTML) views, console windows, etc.) may not easily be provided to the requesting applications. Furthermore, web application code is often most easily inspected, modified, etc. in context of a dynamic language such as JavaScript/HTML. However, it can be challenging to augment a callable application programming interface (API) within a targeted application and/or to provide a sufficient level of isolation from dynamic language code of a web application to ensure its integrity.

SUMMARY

Various approaches are described herein for, among other things, instantiating and executing in-process wrapped execution engine(s) for tooling a dynamic program across a process boundary. A wrapped execution engine is provided by instantiating a dynamic language execution engine in a wrapper object. A dynamic language execution engine is a component (e.g., software, hardware, firmware, or any combination thereof) that is capable of compiling, executing, and/or interpreting dynamic language code. The dynamic language execution engine may be capable of performing other operations with respect to the dynamic language code, including but not limited to accepting, parsing, etc. A wrapped execution engine is said to be "in-process" when it is hosted by an application that is running.

A method is described in which a dynamic language execution engine is instantiated in a wrapper object that is hosted in a host process to provide a wrapped execution engine while the host process is running such that the wrapped execution engine provides information regarding execution of a targeted application of the host process to a requesting application. The wrapped execution engine is isolated from other execution engines that are included in the host process such that the targeted application does not have access to code that defines the wrapped execution engine. The targeted application includes one or more of the other execution engines.

A system is described that includes instantiation logic and execution logic. The instantiation logic is configured to instantiate a dynamic language execution engine in a wrapper object that is hosted in a host process to provide a wrapped execution engine while the host process is running. The execution logic is configured to execute the wrapped execution engine. The wrapped execution engine is configured to provide information regarding execution of a targeted application of the host process to a requesting application. The wrapped execution engine is isolated from other execution engines that are included in the host process such that the targeted application does not have access to code that defines the wrapped execution engine. The targeted application includes one or more of the other execution engines.

A computer program product is described that includes a computer-readable medium having computer program logic recorded thereon for enabling a processor-based system to perform instantiation and execution of a wrapped execution engine for tooling a targeted application across a process boundary. The computer program product includes a first program logic module and a second program logic module. The first program logic module is for enabling the processor-based system to instantiate a dynamic language execution engine in a wrapper object that is hosted in a host process to provide a wrapped execution engine while the host process is running. The second program logic module is for enabling the processor-based system to execute the wrapped execution engine. The wrapped execution engine is configured to provide information regarding execution of a targeted application of the host process to a requesting application. The wrapped execution engine is isolated from other execution engines that are included in the host process such that the targeted application does not have access to code that defines the wrapped execution engine. The targeted application includes one or more of the other execution engines This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 4 depicts an example computer in which embodiments may be implemented.

Figure 1:
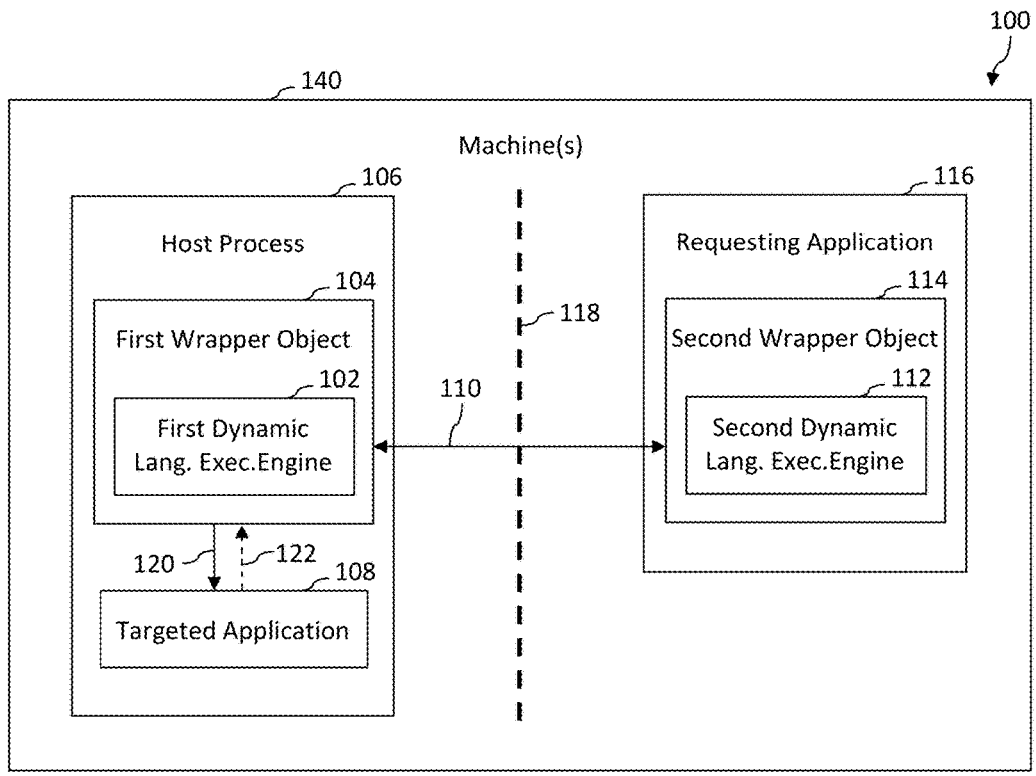
FIG. 1 is a block diagram of an example cross-boundary tooling system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of instantiating and executing in-process wrapped execution engine(s) for tooling a dynamic program across a process boundary. A wrapped execution engine is provided by instantiating a dynamic language execution engine in a wrapper object. A dynamic language execution engine is a component (e.g., software, hardware, firmware, or any combination thereof) that is capable of compiling, executing, and/or interpreting dynamic language code. The dynamic language execution engine may be capable of performing other operations with respect to the dynamic language code, including but not limited to accepting, parsing, etc. A wrapped execution engine is said to be "in-process" when it is hosted by an application that is running.

Example techniques described herein have a variety of benefits as compared to conventional techniques for providing tooling functionality for applications (e.g., web applications). For instance, the example techniques may provide an isolated execution context for the wrapped execution engine that hinders or prevents undesirable interactions with host process code For example, the isolated execution context may hinder or prevent the host process from injecting global variables into the wrapped execution engine that collide with existing variables in the wrapped execution engine. In another example, the isolated execution context may hinder or prevent the wrapped execution engine from injecting global variables into the host process that collide with existing variables in the host process. In yet another example, the isolated execution context may hinder or prevent other tools from reporting variables of the wrapped execution engine as belonging to the host process. For instance, the isolated execution context may hinder or prevent a memory profiler from directly or indirectly attributing memory objects in the wrapped execution engine to the host process when such memory objects are not associated with the host process.

The example techniques may give the wrapped execution engine complete access to the host process via a document object model (DOM) for any suitable purpose such as inspection of the host process, alteration of the host process (e.g., temporarily modifying the DOM to perform a specified function, such as outlining an element of interest with regard to the host process), injecting itself into the general application runtime context (e.g., wiring up for DOM mutation notifications, monkey-patching calls, etc.).

The wrapped execution engine may be capable of running in any environment in which the host process can execute, without a need to modify the environment. The example techniques may be capable of giving the wrapped execution engine access to privileged application programming interfaces (APIs) without granting additional privileges to the host process. The example techniques may be capable of providing the wrapped execution engine access to lower-level APIs, such as those provided by an operating system, and/or creating scaffolding for executing the wrapped execution engine from the dynamic language code, as well. The example techniques may be capable of running the wrapped execution engine on a thread on which other execution engines that are included in the host process run, which may provide greater flexibility, lower cost for querying, etc.

FIG. 1 is a block diagram of an example cross-boundary tooling system 100 in accordance with an embodiment. Generally speaking, computer system 100 operates to instantiate and execute in-process wrapped execution engine(s) for tooling a dynamic program across a process boundary. As shown in FIG. 1, cross-boundary tooling system 100 includes one or more machines 140. Each of the machine(s) 140 is a processing system that is capable of processing information. An example of a processing system is a system that includes at least one processor that is capable of manipulating data in accordance with a set of instructions. For instance, a processing system may be desktop computer, a laptop computer, a tablet computer, a personal digital assistant, a cellular telephone, etc. Although machine(s) 140 are described herein as being processing system(s), it will be recognized that any one or more of the machine(s) 140 may be implemented as a virtual machine.

Machine(s) 140 are configured to execute a host process 106 and a requesting application 116, which are separated by a process boundary 118. Communication between the host process 106 and the requesting application 116 occurs via a communication channel 110. In one example implementation, the host process 106 and the requesting application 116 are executed by a common, single machine. In another example implementation, the host process 106 is executed by a first machine, and the requesting application 116 is executed by a second machine that is different from the first machine. In accordance with this example implementation, the process boundary 118 may also serve as a machine boundary between the first and second machines. In further accordance with this example implementation, communication between the first and second machines may be carried out over a network using well-known network communication protocols. For instance, the network may be a wide-area network (e.g., the Internet), a local area network (LAN), another type of network, or a combination thereof.

The host process 106 hosts a first dynamic language execution engine 102 (e.g., a JavaScript® engine) that is wrapped in a first wrapper object 104. The first dynamic language execution engine 102 may have an execution context that is different from an execution context of the host process 106. For instance, having different execution contexts for the first dynamic language execution engine 102 and the host process 106 may hinder or prevent execution of the first dynamic language execution engine 102 from interfering with execution of the host process 106. The first dynamic language execution engine 102 may use privileged interfaces (e.g., privileged APIs) to interact with the host process 106 (e.g., to inspect and/or modify a state of the host process 106). The first dynamic language execution engine 102 may use such interfaces to access underlying windows APIs for networking, file access, user data, etc. Accordingly, tooling functionality, which otherwise may be implemented using merely lower-level system APIs, may be constructed in a dynamic language (e.g., JavaScript®).

The host process 106 further hosts a targeted application 108. The first dynamic language execution engine 102 provides requests for information regarding the targeted application 108 to the targeted application 108 via the first wrapper object 104 using a communication link 120. Accordingly, the first dynamic language execution engine may access the targeted application 108 using the communication link 120. For instance, the first dynamic language execution engine 102 may request the information in response to receiving a corresponding request for such information or a request for performance of an action that utilizes the information from the requesting application via a communication channel 110. The first dynamic language execution engine 102 receives the requested information via the first wrapper object 104 using communication link 122. It should be noted that the targeted application 108 is unable to access the first dynamic language execution engine 102 using the communication link 122 or any other link. Rather, the targeted application 108 uses the communication link 122 merely to provide information that is explicitly requested by the first dynamic language execution engine 102. Accordingly, the targeted application 108 is not capable of interacting with the first dynamic language execution engine 102, except to respond to requests that are received from the dynamic language execution engine 102.

Although the first dynamic language execution engine 102 is described as providing the requests and receiving the information via the first wrapper object 104, it will be recognized that the requests may originate from the first wrapper object 104, or the first dynamic language execution engine may provide the requests to the targeted application 108 (e.g., directly) without going through the first wrapper object 104.

One example type of a targeted application is referred to as a web application. A web application is an application that is coded in a browser-supported language and that is reliant on a common web browser to render the application executable. JavaScript® is one example type of a browser-supported language. JavaScript® may be combined with other types of languages, including but not limited to a browser-rendered markup language (e.g., hypertext markup language (HTML)), a style sheet language (e.g., cascading style sheets (CSS)) which describes presentation semantics (e.g., look, formatting, etc.) of a document written in a markup language, etc. Examples of a host process include but are not limited to a web browser (e.g., Internet Explorer®, Firefox®, Google Chrome®, Safari®, etc.), a game (e.g., an online game or a console game), etc.

It will be recognized that the host process 106 may host one or more other applications (e.g., web applications) in addition to the targeted application 108. For instance, the host process 106 may be configured to load multiple tabs corresponding to respective web pages. The various applications hosted by the host process 106 or a subset thereof may be isolated from each other while running in the host process 106, though the scope of the example embodiments is not limited in this respect.

The requesting application 116 hosts a second dynamic language execution engine 112 that is wrapped in a second wrapper object 114. The second dynamic language execution engine 112 provides requests for accessing (e.g., tooling) the targeted application 108 to the host process 106. Such requests may specify information to be retrieved regarding the targeted application 108, actions to be performed with regard to the targeted application 108, etc. It should be noted that example cross-boundary tooling system 100 need not necessarily include the second dynamic language execution engine 112 in the second wrapper object 114. For instance, first dynamic language execution engine 102 and/or first wrapper object 104 may communicate with requesting application 116 without going through the second dynamic language execution engine 112 and/or the second wrapper object 114.

One example type of a requesting application is referred to as a tooling application. A tooling application is a requesting application that is capable of being used to perform diagnostic operations (e.g., identifying source of problem, debugging, profiling, controlling, etc.) with respect to a targeted application. Examples of a tooling application include but are not limited to a web development program (e.g., Windows Azure Platform®, Amazon Web Services®, Google App Engine®, VMWare®, Force.com®, etc.) and an integrated development environment (e.g., Microsoft Visual Studio®, JDeveloper®, NetBeans®, Eclipse Platform™, etc.). Accordingly, it will be recognized that the requesting application 116 may be an integrated development environment.

Figure 2:
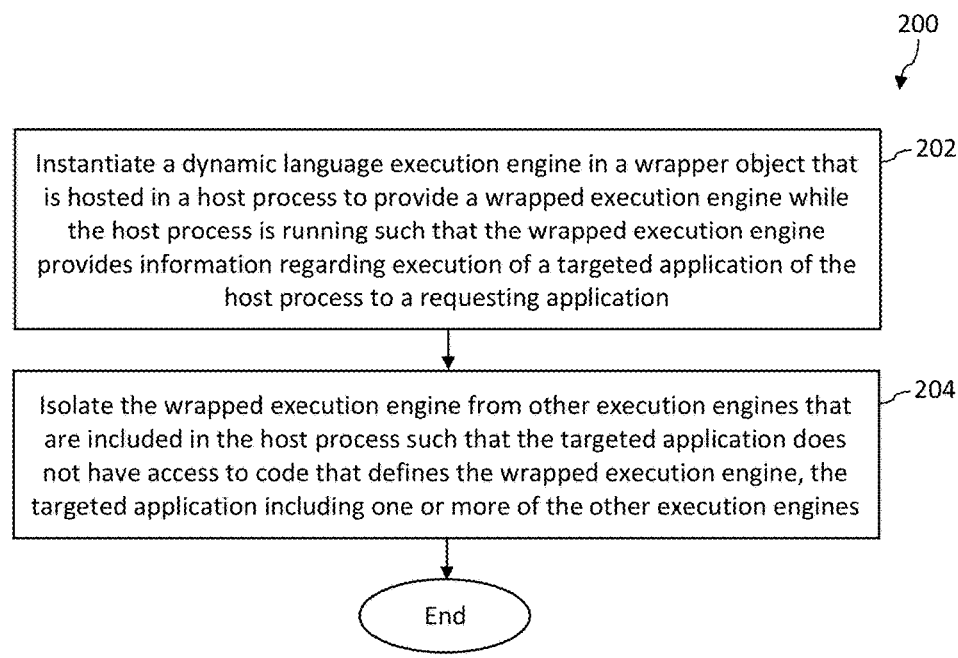
FIG. 2 depicts a flowchart of an example method for instantiating a wrapped execution engine for tooling a targeted application according to an embodiment.
Figure 3:
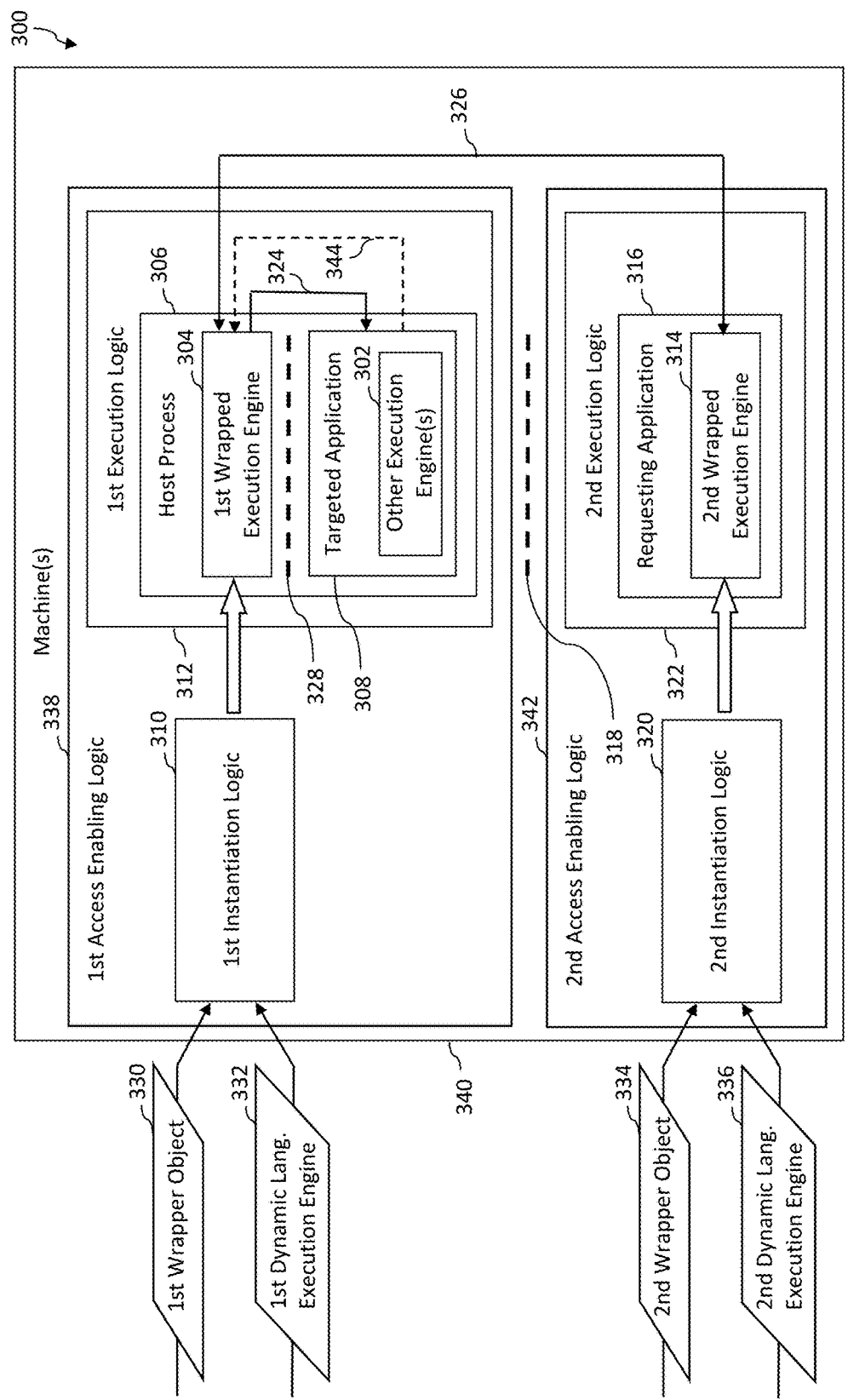
FIG. 3 is a block diagram of an example implementation of a cross-boundary tooling system shown in FIG. 1 in accordance with an embodiment.

FIG. 2 depicts a flowchart 200 of an example method for instantiating wrapped execution engine(s) for tooling a targeted application according to an embodiment. Flowchart 200 may be performed by cross-boundary tooling system 100 of system 100 shown in FIG. 1, for example. For illustrative purposes, flowchart 200 is described with respect to cross-boundary tooling system 300 shown in FIG. 3, which is an example of cross-boundary tooling system 100, according to an embodiment. As shown in FIG. 3, cross-boundary tooling system 300 includes one or more machines 340. Machine(s) 340 include first access enabling logic 338 and second access enabling logic 342. For example, first access enabling logic 338 may be included in a first machine, and second access enabling logic 342 may be included in a second machine. In another example, first access enabling logic 338 and second access enabling logic 342 may be included in a common machine. First access enabling logic 338 includes first instantiation logic 310 and first execution logic 312. Second access enabling logic 342 includes second instantiation logic 320 and second execution logic 322. Further structural and operational embodiments will be apparent to persons skilled in the relevant art(s) based on the discussion regarding flowchart 200.

As shown in FIG. 2, the method of flowchart 200 begins at step 202. In step 202, a dynamic language execution engine is instantiated in a wrapper object that is hosted in a host process to provide a wrapped execution engine while the host process is running such that the wrapped execution engine provides information regarding execution of a targeted application of the host process to a requesting application.

In an example implementation, first execution logic 312 executes a host process 306. In accordance with this implementation, first instantiation logic 310 instantiates a first dynamic language execution engine 332 in a first wrapper object 330 to provide a first wrapped execution engine 304 that is hosted in the host process 306 while the host process 306 is running such that the first wrapped execution engine 304 provides information regarding execution of a targeted application 308 of the host process 306 to a requesting application 316 across a process boundary 318.

One example technique for initializing first wrapped execution engine 304 will now be described for illustrative purposes. In accordance with this technique, first instantiation logic 310 may initialize first wrapped execution engine 304 using any suitable technique(s). In accordance with an example embodiment, first instantiation logic 310 initializes first wrapped execution engine 304 by providing a pointer to first wrapped execution engine 304 that points to the targeted application 308 (e.g., an instance of IWebBrowser2 or IWebApplicationHost). The first instantiation logic 310 may provide read and write handles to first wrapped execution engine 304 for establishing inter-process communication via a communication link 324 and/or a communication channel 326. First instantiation logic 310 may provide a reference to a process (e.g., IDebugApplication110) that enables dynamic querying of the targeted application 308 even when the targeted application 308 is broken within first wrapped execution engine 304.

In further accordance with the aforementioned technique, first wrapped execution engine 304 may construct a pipe helper object from the read and write handles to facilitate messaging. It will be recognized that first instantiation logic 310 may request a most current version of first wrapped execution engine 304 for instantiation (in order to provide access to functionality such as JSON support, etc.), though some tolerance may exist for degrading to down-level versions (i.e., versions that predate the most current version). First instantiation logic 310 may provide a pointer to first wrapped execution engine 304 that points to host process 306 (e.g., via SetScriptSite).

In yet further accordance with the aforementioned technique, first instantiation logic 310 may inject script namespace with respect to first wrapped execution engine 304 using designated APIs and/or variables. Examples of such APIs and/or variables include but are not limited to a reference to host process 306, a reference to targeted application 308, an API to assist with constructing and/or maintaining tool user interface(s), an API to assist with querying and/or deconstructing page CSS style details, an API to assist with general querying of the DOM, console events API, etc.

The aforementioned example technique for initializing first wrapped execution engine 304 is provided for illustrative purposes and is not intended to be limiting. Any suitable technique may be employed by first instantiation logic 310 to initialize first wrapped execution engine 304.

First wrapped execution engine 304 may provide any of a variety of capabilities with regard to accessing the targeted application 308. For example, first wrapped execution engine 304 may provide script error and/or exception information details to the requesting application 316. First wrapped execution engine 304 may provide a DOM capability for adding event listeners to and/or removing event listeners from the targeted application 308. First wrapped execution engine 304 may be capable of establishing and/or connecting ports of HTML5 postMessage communications, for example. First wrapped execution engine 304 may provide target-side functionality to assist with a combined user experience regarding the requesting application 316 and the targeted application 308 (such as code to permit the requesting application 316 to come to the foreground when the targeted application 308 is active), and so on. These example capabilities are provided for illustrative purposes and are not intended to be limiting.

In accordance with the aforementioned implementation, the process boundary 318 may be attributable to the host process 306 or to the requesting application 316. In further accordance with this implementation, the first wrapped execution engine 304 may retrieve the information from the targeted application 308 via communication link 344, determine the information based on execution of the targeted application 308, etc. For instance, the first wrapped execution engine 304 may provide the information to the requesting application 316 via the communication channel 326. Following is an example code snippet that may be used by the first wrapped execution engine 304 for communicating with the requesting application 316:

```
function onMessage(e)
{
    var obj = JSON.parse(e.data);
    ... // Do something with obj
}
var port = toolUI.connect("infoChannel");
port.addEventListener("message", onMessage);
var objToSend = { ... };
port.postMessage(JSON.stringify(objToSend));
```

At step 204, the wrapped execution engine is isolated from other execution engines that are included in the host process such that the targeted application does not have access to code that defines the wrapped execution engine. For example, the wrapped execution engine may be configured to be undetectable by the targeted application. In accordance with this example, the targeted application may be unaware of the wrapped execution engine. In another example, the wrapped execution engine may have access to code that defines the targeted application. The targeted application includes one or more of the other execution engines. The targeted application may further include other component(s), including but not limited to the DOM, a rendering surface and associated layout and/or styling information, though the scope of the embodiments is not limited in this respect.

In an example implementation, first execution logic 312 executes the first wrapped execution engine 304 and other execution engine(s) 302 that are included in the host process 306. In accordance with this implementation, first execution logic 312 isolates the first wrapped execution engine 304 from the other execution engine(s) 302 such that the targeted application 308 does not have access to code that defines the first wrapped execution engine 304. For example, an isolation barrier 328 may be attributable to the first wrapped execution engine 304. In accordance with this example, first execution logic 312 may hinder or prevent the other execution engine(s) 302 from traversing the isolation barrier 328. The targeted application 308 is shown in FIG. 3 to include all of the other execution engine(s) 302 for illustrative purposes and is not intended to be limiting. It will be recognized that the targeted application 308 may include any one or more of the other execution engine(s) 302.

In some example embodiments, one or more steps 202 and/or 204 of flowchart 200 may not be performed. Moreover, steps in addition to or in lieu of steps 202 and/or 204 may be performed. For instance, in an example embodiment, flowchart 200 includes running the wrapped execution engine in an environment (e.g., runtime) of the targeted application without modifying the environment to accommodate the wrapped execution engine. In an example implementation, first execution logic 312 runs the first wrapped execution engine 304 in an environment of the targeted application 308 without modifying the environment to accommodate the first wrapped execution engine 304. For example, first execution logic 312 may cause the first wrapped execution engine 304 to tool a runtime of the targeted application 308 without configuring the runtime to be in a debug mode, which can substantially alter the runtime characteristics of the code that defines the targeted application 308. It will be recognized that, for tooling scenarios in which information that is precisely tuned to actual execution is to be inspected and/or collated, this embodiment may provide an advantage over conventional techniques for providing tooling functionality for applications. Moreover, in contrast to conventional debugging scenarios, tooling of the targeted application 308 may be performed without restarting the host process 306 in accordance with this embodiment.

In another example embodiment, flowchart 200 includes running the wrapped execution engine on a thread on which the other execution engines run. In an example implementation, first execution logic 312 runs the first wrapped execution engine 304 on a thread on which the other execution engine(s) 302 run.

In yet another example embodiment, flowchart 200 includes receiving a request from a tooling process of the requesting application at the wrapped execution engine. The request specifies a tooling operation to be performed with regard to the targeted application. In one example, the tooling process and the wrapped execution engine may be implemented using scripting language (e.g., JavaScript®) code in HTML code. In another example, the targeted application may be implemented using scripted language code (e.g., in HTML code). In an example implementation, second execution logic 322 executes the requesting application 316. In accordance with this implementation, the first wrapped execution engine 304 receives a request from a tooling process of the requesting application 316. The request specifies a tooling operation to be performed with regard to the targeted application 308.

In one aspect of this embodiment, inspecting and/or modifying a state of the targeted application (e.g., targeted application 308) is performed by the wrapped execution engine (e.g., first wrapped execution engine 304) via a document object model based on receipt of the request. In another aspect, code is injected into a runtime of the targeted application by the wrapped execution engine based on receipt of the request. In yet another aspect, the tooling operation is performed by the wrapped execution engine. In accordance with this aspect, arbitrary native code (e.g., operating system (OS) code) is executed by the wrapped execution engine based on receiving the request from the tooling process. For instance, execution of the arbitrary code may include modifying a registry, triggering a reboot of the targeted application, etc. In further accordance with this aspect, information regarding execution of the arbitrary native code is provided from the wrapped execution engine to the tooling process. For example, the information may pertain to a runtime (e.g., describe a state of the runtime) of the targeted application. In accordance with this example, the information may indicate and/or describe script errors) and/or exception detail(s) that may cause execution of the targeted application to discontinue.

In still another aspect of the aforementioned embodiment, information regarding a first instance of a user interface that is associated with the targeted application (e.g., targeted application 308) is forwarded from the wrapped execution engine (e.g., first wrapped execution engine 304) to the tooling process such that the wrapped execution engine causes a second instance of the user interface to be integrated in the requesting application (e.g., requesting application 316). Accordingly, the second instance of the user interface may provide a representation of a current actual appearance of the targeted application that is provided by the first instance of the user interface. For example, the second instance of the user interface may serve as an input surrogate for the targeted application, such that a user of the requesting application is capable of interacting with the second instance of the user interface. In accordance with this example, the user of the requesting application may provide instructions for controlling the targeted application via the second instance of the user interface. Such instructions may be received from the second user interface by the targeted application. The targeted application may raise and/or emulate events that are specified by the instructions based on receipt of those instructions.

In accordance with this aspect, flowchart 200 may include forwarding association information from the wrapped execution engine to the tooling process. The association information indicates that an association of the first instance of the user interface is changed from a first web page to a second web page. In further accordance with this aspect, the forwarding of the association information causes an association of the second instance of the user interface to be changed from the first web page to the second web page.

In another embodiment, flowchart 200 includes instantiating a second dynamic language execution engine in a second wrapper object that is hosted in the requesting application to provide a second wrapped execution engine while the requesting application is running. In an example implementation, second execution logic 322 executes the requesting application 316. In accordance with this implementation, second instantiation logic 320 instantiates a second dynamic language execution engine 336 in a second wrapper object 334 to provide a second wrapped execution engine 314 that is hosted in the requesting application 316 while the requesting application 316 is running. The second wrapped execution engine 314 may be configured to communicate with the host process 306 via the communication channel 326. Following is an example code snippet that may be used by the second wrapped execution engine 314 for communicating with the host process 306:

```
function onConnect(port)
{
    If (port.name == "infoChannel") { port.addEventListener("message", onMessage);
}
function onMessage(e)
{
    var obj = JSON.parse(e.data);
    ... // Do something with obj
}
window.external.addEventListener("connect", onConnect);
window.external.loadScript("ieside.js");
```

It should be noted that the first wrapped execution engine 304 may provide functionality (e.g., reporting with regard to the targeted application 308) that is not authored in dynamic language code but that responds to requests from dynamic language code of the second wrapped execution engine 314. Network notifications, for example, may be captured and/or converted to messages that appear to the second wrapped execution engine 314 just as messages that originate directly from the targeted application 308 appear. Conversely, a tool window (by implementing appropriate interfaces) is capable of being authored in native code and/or native languages other than JavaScript® and/or HTML, for example. Accordingly, the functionality described with respect to cross-boundary tooling system 300 need not necessarily depend on both the first wrapped execution engine 304 and the second wrapped execution engine 314 being included in cross-boundary tooling system 300.

In an aspect of the aforementioned embodiment, information is received at the second wrapped execution engine (e.g., second wrapped execution engine 314) from the requesting application (e.g., requesting application 316). In accordance with this aspect, an operation is performed by the second wrapped execution engine based on the information. The second wrapped execution engine may be executed in a tooling process of the requesting application, though the scope of the example embodiments is not limited in this respect.

In one example of this aspect, the information may indicate that an element of a tooling process of the requesting application is to be selected. In accordance with this example, performing the operation may include highlighting the element of the tooling process to indicate that the element is selected.

In another example of this aspect, the information may include an indication of a changed style, which results from a change of a style associated with a first user interface that corresponds to the requesting application. In accordance with this example, performing the operation may include updating a second user interface that corresponds to a tooling process of the requesting application to have the changed style by the second wrapped execution engine based on the indication. In further accordance with this example, the changed style may include a change of a color theme (e.g., a blue theme changed to a gray theme), a change of a skin, a change of a contract setting, a change from a first setting of white letters on a black background to a second setting black letters on a white background, etc. A skin is a custom graphical appearance achieved by use of a graphical user interface (GUI) that can be applied to a process to suit a purpose, topic, or tastes of a user.

In another aspect, a call is made into the requesting application by the second wrapped execution engine such that the second wrapped execution engine causes the requesting application to perform an operation. In one example of this aspect, the second wrapped execution engine may instruct a tooling process of the requesting application to access a resource (e.g., author code that defines the targeted application) in response to receipt of a request from the tooling process that is based on selection by a user of a link that is provided in a user interface that corresponds to the requesting application. In accordance with this example, the link is linked to the resource. Author code is code from which the targeted application is constructed before changes are made to the code during execution of the code. For purposes of explanation, code associated with the targeted application may be transformed by the host process for any of a variety of reasons, including but not limited to parsing, ongoing dynamic language execution, etc. Such transformed code may be different (perhaps substantially different) from the author code.

In another example of this aspect, the second wrapped execution engine may cause the requesting application to provide information to the second wrapped execution engine (e.g., to enable the second wrapped execution engine to do some work).

In another example of this aspect, the second wrapped execution engine may request attribute information that pertains to one or more attributes of a first user interface that corresponds to the requesting application to cause the requesting application to provide the attribute information to the second wrapped execution engine. In accordance with this example, the second wrapped execution engine may configure a second user interface that corresponds to a tooling process of the requesting application to have the one or more attributes based on the attribute information. One example of an attribute is a language, such as German, Spanish, English, etc. For instance, the second wrapped execution engine may modify the second user interface to conform to a language of the requesting application. The second wrapped execution engine may be configured to dynamically modify the second user interface in response to a communication received from the requesting application.

In yet another aspect, a communication channel (e.g., communication channel 326) is established between the wrapped execution engine (e.g., first wrapped execution engine 304) hosted in the host process (e.g., host process 306) and the second wrapped execution engine hosted in the requesting application. In accordance with this aspect, the information regarding the execution of the targeted application (e.g., targeted application 308) is transferred by the wrapped execution engine hosted in the host process to the second wrapped execution engine hosted in the requesting application via the communication channel.

In an example embodiment, flowchart 200 includes receiving a plurality of requests from a tooling process of the requesting application at the wrapped execution engine. The plurality of requests specifies a tooling operation to be performed with regard to the targeted application. In accordance with this embodiment, a plurality of responses that corresponds to the plurality of respective requests is aggregated at the wrapped execution engine to provide a single response. In further accordance with this embodiment, the single response is sent by the wrapped execution engine to the tooling process via the document object model. In an example implementation, the first wrapped execution engine 304 receives the plurality of requests, aggregates the plurality of responses, and sends the single response to the tooling process.

In still another example embodiment, flowchart 200 includes causing a tooling user interface to be moved from a secondary position behind a different user interface to a primary position in front of the different user interface based on occurrence of a designated event with regard to the targeted application. The tooling user interface enables a user to access tooling functionality of a tooling process of the requesting application for performing tooling operations with regard to the targeted application. The different user interface is used by the tooling process to provide a visual representation that corresponds to the targeted application.

In accordance with this embodiment, causing the tooling process to be moved includes providing a notification by the wrapped execution engine to the tooling process. The notification specifies that the designated event occurs with regard to the targeted application. For instance, occurrence of the designated event may include encountering a break point in code of the targeted application. A break point is a location in programming code that, when reached, triggers a halt (e.g., a temporary halt) of a program in which the break point exists. Accordingly, a break point in the code of the targeted application is a location in the code that, when reached, triggers a halt (e.g., a temporary halt) of the targeted application.

In an example implementation, the second wrapped execution engine 314 causes the tooling user interface to be moved from the secondary position behind the different user interface to the primary position in front of the different user interface based on occurrence of the designated event with regard to the targeted application 308. For instance, the second wrapped execution engine 314 may cause the tooling user interface to be moved based on an identifier that identifies the requesting application 316.

First access enabling logic 338 and/or second access enabling logic 342 may be implemented in various ways to instantiate and execute in-process wrapped execution engine(s) for tooling a dynamic program across a process boundary, including being implemented in hardware, software, firmware, or any combination thereof. For example, first access enabling logic 338 and/or second access enabling logic 342 may be implemented as computer program code configured to be executed in one or more processors. In another example, first access enabling logic 338 and/or second access enabling logic 342 may be implemented as hardware logic/electrical circuitry. In an embodiment, first access enabling logic 338 and/or second access enabling logic 342 may be implemented in a system-on-chip (SoC). Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

It will be recognized that cross-boundary tooling system 300 may not include one or more of the other execution engine(s) 302, first wrapped execution engine 304, host process 306, targeted application 308, first instantiation logic 310, first execution logic 312, second instantiation logic 320, second execution logic 322, first access enabling logic 338, and/or second access enabling logic 342. Furthermore, cross-boundary tooling system 300 may include modules in addition to or in lieu of other execution engine(s) 302, first wrapped execution engine 304, host process 306, targeted application 308, first instantiation logic 310, first execution logic 312, second instantiation logic 320, second execution logic 322, first access enabling logic 338, and/or second access enabling logic 342.

Any one or more of machine(s) 140, machine(s) 340, first instantiation logic 310, first execution logic 312, second instantiation logic 320, second execution logic 322, and flowchart 200 may be implemented in hardware, software, firmware, or any combination thereof. For example, any one or more of machine(s) 140, machine(s) 340, first instantiation logic 310, first execution logic 312, second instantiation logic 320, second execution logic 322, and/or flowchart 200 may be implemented as computer program code configured to be executed in one or more processors. In another example, any one or more of machine(s) 140, machine(s) 340, first instantiation logic 310, first execution logic 312, second instantiation logic 320, second execution logic 322, and/or flowchart 200 may be implemented as hardware logic/electrical circuitry.

For instance, in an embodiment, one or more of machine(s) 140, machine(s) 340, first instantiation logic 310, first execution logic 312, second instantiation logic 320, second execution logic 322, and/or flowchart 200 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

FIG. 4 depicts an example computer 400 in which embodiments may be implemented. Any one or more of machine(s) 140 shown in FIG. 1 or any one or more of machine(s) 300 shown in FIG. 3 may be implemented using computer 400, including one or more features of computer 400 and/or alternative features. Computer 400 may be a general-purpose computing device in the form of a conventional personal computer, a mobile computer, or a workstation, for example, or computer 400 may be a special purpose computing device. The description of computer 400 provided herein is provided for purposes of illustration, and is not intended to be limiting. Embodiments may be implemented in further types of computer systems, as would be known to persons skilled in the relevant art(s).

As shown in FIG. 4, computer 400 includes a processing unit 402, a system memory 404, and a bus 406 that couples various system components including system memory 404 to processing unit 402. Bus 406 represents one or more of any of several types of bus structures, including a memory bus or memory controller, a peripheral bus, an accelerated graphics port, and a processor or local bus using any of a variety of bus architectures. System memory 404 includes read only memory (ROM) 408 and random access memory (RAM) 410. A basic input/output system 412 (BIOS) is stored in ROM 408.

Computer 400 also has one or more of the following drives: a hard disk drive 414 for reading from and writing to a hard disk, a magnetic disk drive 416 for reading from or writing to a removable magnetic disk 418, and an optical disk drive 420 for reading from or writing to a removable optical disk 422 such as a CD ROM, DVD ROM, or other optical media. Hard disk drive 414, magnetic disk drive 416, and optical disk drive 420 are connected to bus 406 by a hard disk drive interface 424, a magnetic disk drive interface 426, and an optical drive interface 428, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 430, one or more application programs 432, other program modules 434, and program data 436. Application programs 432 or program modules 434 may include, for example, computer program logic for implementing any one or more of machine(s) 140, machine(s) 340, other execution engine(s) 302, first wrapped execution engine 304, host process 306, targeted application 308, first instantiation logic 310, first execution logic 312, second instantiation logic 320, second execution logic 322, first access enabling logic 338, second access enabling logic 342, and/or flowchart 200 (including any step of flowchart 200), as described herein.

A user may enter commands and information into the computer 400 through input devices such as keyboard 438 and pointing device 440. Other input devices (not shown)

may include a microphone, joystick, game pad, satellite dish, scanner, touch screen, camera, accelerometer, gyroscope, or the like. These and other input devices are often connected to the processing unit 402 through a serial port interface 442 that is coupled to bus 406, but may be connected by other interfaces, such as a parallel port, game port, or a universal serial bus (USB).

A display device 444 (e.g., a monitor) is also connected to bus 406 via an interface, such as a video adapter 446. In addition to display device 444, computer 400 may include other peripheral output devices (not shown) such as speakers and printers.

Computer 400 is connected to a network 448 (e.g., the Internet) through a network interface or adapter 450, a modem 452, or other means for establishing communications over the network. Modem 452, which may be internal or external, is connected to bus 406 via serial port interface 442.

As used herein, the terms "computer program medium" and "computer-readable medium" are used to generally refer to non-transitory media such as the hard disk associated with hard disk drive 414, removable magnetic disk 418, removable optical disk 422, as well as other non-transitory media such as flash memory cards, digital video disks, random access memories (RAMs), read only memories (ROM), and the like. Such computer-readable storage media are distinguished from and non-overlapping with communication media. Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

As noted above, computer programs and modules (including application programs 432 and other program modules 434) may be stored on the hard disk, magnetic disk, optical disk, ROM, or RAM. Such computer programs may also be received via network interface 450 or serial port interface 442. Such computer programs, when executed or loaded by an application, enable computer 400 to implement features of embodiments discussed herein. Accordingly, such computer programs represent controllers of the computer 400.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

III. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A method comprising:
   instantiating a dynamic language execution engine in a wrapper object that is hosted in a host process to provide a wrapped execution engine while the host process is running such that the wrapped execution engine provides information regarding execution of a targeted application of the host process to a tooling application; and
   isolating the wrapped execution engine from other execution engines that are included in the host process such that the targeted application does not have access to code that defines the wrapped execution engine, the targeted application including one or more of the other execution engines;
   receiving a request from a tooling process of the tooling application at the wrapped execution engine, the request specifying a tooling operation to be performed with regard to the targeted application; and
   performing an operation based on receipt of the request.

2. The method of claim 1, wherein instantiating the dynamic language execution engine comprises:
   instantiating the dynamic language execution engine in the wrapper object that is hosted in the host process while the host process is running on a first machine such that the wrapped execution engine provides the information regarding the execution of the targeted application of the host process to the tooling application running on a second machine that is different from the first machine.

3. The method of claim 1, wherein performing the operation comprises:
   performing at least one of inspecting or modifying a state of the targeted application by the wrapped execution engine via a document object model based on receipt of the request.

4. The method of claim 1, wherein performing the operation comprises:
   injecting code into a runtime of the targeted application by the wrapped execution engine based on receipt of the request.

5. The method of claim 1, wherein performing the operation comprises:
   performing the tooling operation by the wrapped execution engine, including
      executing arbitrary native code by the wrapped execution engine based on receiving the request from the tooling process; and
      providing information regarding execution of the arbitrary native code from the wrapped execution engine to the tooling process.

6. The method of claim 1, wherein performing the operation comprises:
   forwarding information regarding a first instance of a user interface that is associated with the targeted application from the wrapped execution engine to the tooling process such that the wrapped execution engine causes a second instance of the user interface to be integrated in the tooling application.

7. The method of claim 6, further comprising:
   forwarding association information from the wrapped execution engine to the tooling process, the association information indicating that an association of the first instance of the user interface is changed from a first web page to a second web page;

wherein the forwarding of the association information causes an association of the second instance of the user interface to be changed from the first web page to the second web page.

8. The method of claim 1, wherein receiving the request comprises:

receiving a plurality of requests from the tooling process of the tooling application at the wrapped execution engine, the plurality of requests specifying a tooling operation to be performed with regard to the targeted application; and wherein performing the operation comprises:

aggregating a plurality of responses that corresponds to the plurality of respective requests at the wrapped execution engine to provide a single response; and sending the single response by the wrapped execution engine to the tooling process via the document object model.

9. The method of claim 1, further comprising:

causing a tooling user interface, which enables a user to access tooling functionality of the tooling process of the tooling application for performing tooling operations with regard to the targeted application, to be moved from a secondary position behind a different user interface to a primary position in front of the different user interface based on occurrence of a designated event with regard to the targeted application, the different user interface being used by the tooling process to provide a visual representation that corresponds to the targeted application;

wherein causing the tooling process to be moved comprises:

providing a notification by the wrapped execution engine to the tooling process, the notification specifying that the designated event occurs with regard to the targeted application.

10. A system comprising:

one or more processors;

instantiation logic, implemented using at least one of the one or more processors, configured to instantiate a dynamic language execution engine in a wrapper object that is hosted in a host process to provide a wrapped execution engine while the host process is running; and execution logic, implemented using at least one of the one or more processors, configured to execute the wrapped execution engine, the wrapped execution engine configured to provide information regarding execution of a targeted application of the host process to a tooling application, the wrapped execution engine being isolated from other execution engines that are included in the host process such that the targeted application does not have access to code that defines the wrapped execution engine, the targeted application including one or more of the other execution engines, the wrapped execution engine further configured to receive a request from a tooling process of the tooling application, the request specifying a tooling operation to be performed with regard to the targeted application.

11. The system of claim 10, wherein the instantiation logic is configured to instantiate the dynamic language execution engine in the wrapper object that is hosted in the host process while the host process is running on a first machine; and wherein the wrapped execution engine is configured to provide the information regarding the execution of the targeted application of the host process to the tooling application running on a second machine that is different from the first machine.

12. The system of claim 10, wherein the execution logic is configured to run the wrapped execution engine in an environment of the targeted application without the environment being modified to accommodate the wrapped execution engine.

13. The system of claim 10, wherein the execution logic is configured to run the wrapped execution engine on a thread on which the other execution engines run.

14. The system of claim 10, further comprising:

second instantiation logic configured to instantiate a second dynamic language execution engine in a second wrapper object that is hosted in the tooling application to provide a second wrapped execution engine while the tooling application is running;

wherein the second wrapped execution engine is configured to perform operations based on information that is received at the second wrapped execution engine from the tooling application.

15. The system of claim 10, further comprising:

second instantiation logic configured to instantiate a second dynamic language execution engine in a second wrapper object that is hosted in the tooling application to provide a second wrapped execution engine while the tooling application is running;

wherein the second wrapped execution engine is configured to call into the tooling application to cause the tooling application to perform operations.

16. The system of claim 10, further comprising:

second instantiation logic configured to instantiate a second dynamic language execution engine in a second wrapper object that is hosted in the tooling application to provide a second wrapped execution engine while the tooling application is running;

wherein the wrapped execution engine in the host process and the second wrapped execution engine in the tooling application collaboratively establish a communication channel between the wrapped execution engine hosted in the host process and the second wrapped execution engine hosted in the tooling application; and wherein the wrapped execution engine hosted in the host process is configured to provide the information regarding the execution of the targeted application to the second wrapped execution engine hosted in the tooling application via the communication channel.

17. The system of claim 10, wherein the wrapped execution engine is configured to aggregate a plurality of responses that corresponds to a plurality of respective requests from the tooling process of the tooling application to provide a single response, the plurality of requests specifying a tooling operation to be performed with regard to the targeted application; and wherein the wrapped execution engine is configured to send the single response to the tooling process via a document object model.

18. A computer program product comprising a computer-readable medium having computer program logic recorded thereon for enabling a processor-based system to instantiate an in-process wrapped execution engine for tooling a web browser remotely across a process boundary, the computer program product comprising:

a first program logic module for enabling the processor-based system to instantiate a dynamic language execution engine in a wrapper object that is hosted in a web browser to provide the in-process wrapped execution engine while the web browser is running; and a second program logic module for enabling the processor-based system to execute the in-process wrapped execution engine, which is configured to perform a tooling operation with regard to a targeted web page of the web browser via a document object model based on a request that is received from an integrated development environment, the in-process wrapped execution engine being isolated from other execution engines that are included in the web browser such that the targeted web page does not have access to code that defines the in-process wrapped execution engine, the targeted web page including one or more of the other execution engines.

19. The computer program product of claim 18, wherein the in-process wrapped execution engine is configured to perform at least one of inspection or modification of a state of the targeted web page via the document object model based on receipt of a request from a tooling process of the integrated development environment, the request specifying that a tooling operation is to be performed with regard to the targeted web page.

20. The computer program product of claim 18, wherein the in-process wrapped execution engine is configured to inject code into a runtime of the targeted web page based on receipt of a request from a tooling process of the integrated development environment, the request specifying that a tooling operation is to be performed with regard to the targeted web page.

* * * * *